United States Patent
Zhang et al.

(10) Patent No.: US 10,522,035 B2
(45) Date of Patent: Dec. 31, 2019

(54) NAVIGATION SYSTEMS FOR A VEHICLE AND AN AUXILLIARY VEHICLE

(71) Applicant: Ford Global Technologies LLC, Dearborn, MI (US)

(72) Inventors: Yvonne Zhang, Nanjing (CN); Vincent Zou, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 244 days.

(21) Appl. No.: 15/697,945

(22) Filed: Sep. 7, 2017

(65) Prior Publication Data

US 2018/0082585 A1 Mar. 22, 2018

(30) Foreign Application Priority Data

Sep. 21, 2016 (CN) .......................... 2016 1 0839943

(51) Int. Cl.
| | |
|---|---|
| *G01C 21/20* | (2006.01) |
| *G08G 1/0968* | (2006.01) |
| *G06Q 10/04* | (2012.01) |

(52) U.S. Cl.
CPC ....... *G08G 1/096805* (2013.01); *G01C 21/20* (2013.01); *G06Q 10/047* (2013.01); *G08G 1/096883* (2013.01)

(58) Field of Classification Search
CPC .. G01C 21/20; G01C 21/3423; G06Q 10/047; G08G 1/096805; G08G 1/096822; G08G 1/09685; G08G 1/096883; B60L 58/10; B60R 16/0232
See application file for complete search history.

(56) References Cited

U.S. PATENT DOCUMENTS

| | | | |
|---|---|---|---|
| 8,887,852 B2 | 11/2014 | Schaap | |
| 9,658,076 B2 | 5/2017 | Aich et al. | |
| 2006/0267799 A1 | 11/2006 | Mendelson | |
| 2013/0274951 A1* | 10/2013 | Gerhardt | G01C 21/3469 701/1 |
| 2014/0196968 A1 | 7/2014 | Bieler et al. | |
| 2015/0321722 A1 | 11/2015 | Dadoosh et al. | |
| 2015/0353160 A1 | 12/2015 | Augustinoy et al. | |
| 2016/0097650 A1* | 4/2016 | Aich | B60L 58/12 701/22 |

FOREIGN PATENT DOCUMENTS

| | | |
|---|---|---|
| CN | 201912750 U | 8/2011 |
| CN | 105486318 A | 4/2016 |
| CN | 105486318 A | 4/2016 |
| IN | 2280/CHE/2014 | 1/2015 |

OTHER PUBLICATIONS

Appscooter; https://boltmobility.com/#oht:lang=en-us.

* cited by examiner

*Primary Examiner* — Anshul Sood
(74) *Attorney, Agent, or Firm* — Brandon Hicks; Kolitch Romano LLP (57) ABSTRACT

A navigation system for a vehicle and an auxiliary vehicle comprises a processing module configured to obtain information on an energy level of a power source in the auxiliary vehicle and determine a remaining traveling range of the auxiliary vehicle based on the energy level; and a navigation module configured to suggest at least one stop for the vehicle between a starting place and a destination based on the remaining traveling range of the auxiliary vehicle and an environment condition.

19 Claims, 7 Drawing Sheets

NAVIGATION SYSTEMS FOR A VEHICLE AND AN AUXILLIARY VEHICLE

RELATED APPLICATION

This application claims the benefit of Chinese Patent Application No.: CN 201610839943.2 filed on Sep. 21, 2016, the entire contents thereof being incorporated herein by reference.

FIELD

The invention relates to a navigation system for a vehicle and an auxiliary vehicle, in particular, to a navigation system to guide a user to drive the vehicle and the auxiliary vehicle in a trip.

BACKGROUND

Driving a car to work is common in modern life. However, it is difficult for a user to find a parking spot in a congested city. Often, a parking lot near a business area or an office area charges daily fee that may not be affordable by many drivers while parking at curbside may be prohibited in some areas or it is difficult to find a parking spot at the curbside. One option is to park a car at a location far away from a destination. Although the parking fee is lower at such location, there is a long walk for a driver.

One solution is to stow an auxiliary vehicle in a car and then drive the auxiliary vehicle from a stop to an office. The auxiliary vehicle may include a battery powered personal transportation devices such as an electric scooter. Driving the auxiliary vehicle to a destination from the parking lot will save lots of time comparing with walking. However, a remaining driving range of an auxiliary vehicle may be limited. The destination may not be reached by the auxiliary vehicle if the parking lot is too far away from the destination. Therefore, it is a challenge to select a parking lot with a suitable distance from the destination and an affordable fee.

Chinese Patent CN 105486318A discloses a vehicle system which includes a charging interface configured to connected to a bicycle battery, and a processing device programmed to monitor a state of charge of the bicycle battery. The processing device is configured to further estimate the traveling ranges of both a vehicle and a bicycle. The vehicle system further comprises a navigation module programmed to generate a route to a selected destination based on the estimated traveling range of both the vehicle and the bicycle.

The inventors have recognized that environment conditions can be considered in selection of a stop at which a user switches from a car to another personal transportation device such that a user will have good experience in riding the personal transportation device in a trip.

SUMMARY

According to one aspect, a navigation system for a vehicle and an auxiliary vehicle is provided. The navigation system comprises a processing module configured to obtain information on an energy level of a power source in the auxiliary vehicle and determine a remaining traveling range of the auxiliary vehicle based on the energy level; and a navigation module configured to suggest at least one stop for the vehicle between a starting place and a destination based on the remaining traveling range of the auxiliary vehicle and an environment condition.

In one embodiment, the processing module and the navigation module is integrated in a navigation unit of in an in-vehicle device.

In another, embodiment, the stop is selected such that a distance between the stop and the destination does not exceed the remaining driving range of the auxiliary vehicle.

In another embodiment, the stop is selected such that a distance between the stop and the destination does not exceed a half of the remaining driving range of the auxiliary vehicle.

In another embodiment, the auxiliary vehicle is a personal mobility vehicle powered by a battery, and the energy level of the auxiliary vehicle is a state of charge of the battery and the state of charge of the battery is monitored in real time.

In another embodiment, the auxiliary vehicle is charged by a power source of vehicle while the vehicle is travelling to the stop, and the state of charge of the battery of the auxiliary vehicle is estimated based on a time needed to arrive in the stop.

In another embodiment, the navigation system further comprises a smart phone, wherein the smart phone is configured to communicate with the navigation unit and a control system of the auxiliary vehicle to obtain the information on the energy level of the auxiliary vehicle.

In another embodiment, the navigation system further comprises a user interface to present at least one selected stop to a user, and controls to enable the user to select a stop.

In another embodiment, the environment condition is a parking lot condition, wherein the navigation unit is configured to communicate with a trip management server connected with a parking lot database to obtain information on locations, parking fees and availability of parking lots, and wherein the navigation module is configured to present to a user a list of suggested parking lot including information on the parking fees and the availability.

In another embodiment, the environment condition is a weather condition, wherein the navigation unit is configured to communicate with a trip management server connected with a weather content provider to obtain information on weather condition, and the navigation module is configured to present to a user a list of the stops with information on the weather condition.

In another embodiment, the distance from the stop to the destination is shorter in an unfavorable weather condition comparing a normal weather condition, and wherein the list further includes weather conditions including temperature and air quality index at each stop.

In another embodiment, the environment condition is a traffic condition. The navigation unit is configured to communicate with a trip management server connected with a traffic content provider to obtain information on real time traffic condition, and the navigation module is configured to present to a user a list of stops with information on a distance from a stop to the destination and estimated time to arrive in the destination.

In another embodiment, the navigation module is further configured to generate a route between the starting location and a selected stop for the vehicle and a route between the selected stop and the selected destination for the auxiliary vehicle.

In another embodiment, the navigation system further comprises a smart phone, wherein the smart phone is connected to the navigation unit to integrate functions of the navigation unit, wherein the smart phone is further connected to the auxiliary vehicle.

In another embodiment, the auxiliary vehicle is an electrical scooter, a Segway, an electric bicycle or an electrical unicycle.

According to another aspect, a method implemented in a vehicle navigation system is provides. The vehicle navigation system including a vehicle and an auxiliary vehicle capable of being stowed in the vehicle. The method comprises monitoring an energy level of the auxiliary vehicle; estimating a remaining travelling range of the auxiliary vehicle based on the energy level; and suggesting at least one stop between a starting place and a destination based on the remaining traveling range of the auxiliary vehicle and an environment condition.

In one embodiment, the method further comprises communicating with a trip management server to obtain information on the environment condition. The environment condition is one of a parking condition, a weather condition and a traffic condition.

In another embodiment, the method further comprises receiving a user input on a selected stop and generating a route between the starting location to the selected stop for the vehicle, and generating a route between the selected stop and the destination for the auxiliary vehicle.

In another embodiment, the method further comprises presenting a list of stops to a user. The list of stops includes information on the environment condition.

The navigation system and the method of the present disclosure recommends a stop for a vehicle based on a remaining travel range of the auxiliary vehicle and an environment condition. Thus, a capacity of a battery of the auxiliary vehicle is considered as well as the environment conditions such as a parking availability/fee, weather condition and/or road condition. As such, the selection of the stop or a route based on the environment condition further optimize the route selection and provides the user a comfortable experience in the journey.

BRIEF DESCRIPTION OF THE DRAWINGS

Example embodiments will be more clearly understood from the following brief description taken in conjunction with the accompanying drawings. The accompanying drawings represent non-limiting, example embodiments as described herein

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed navigation systems and method will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various navigation systems and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
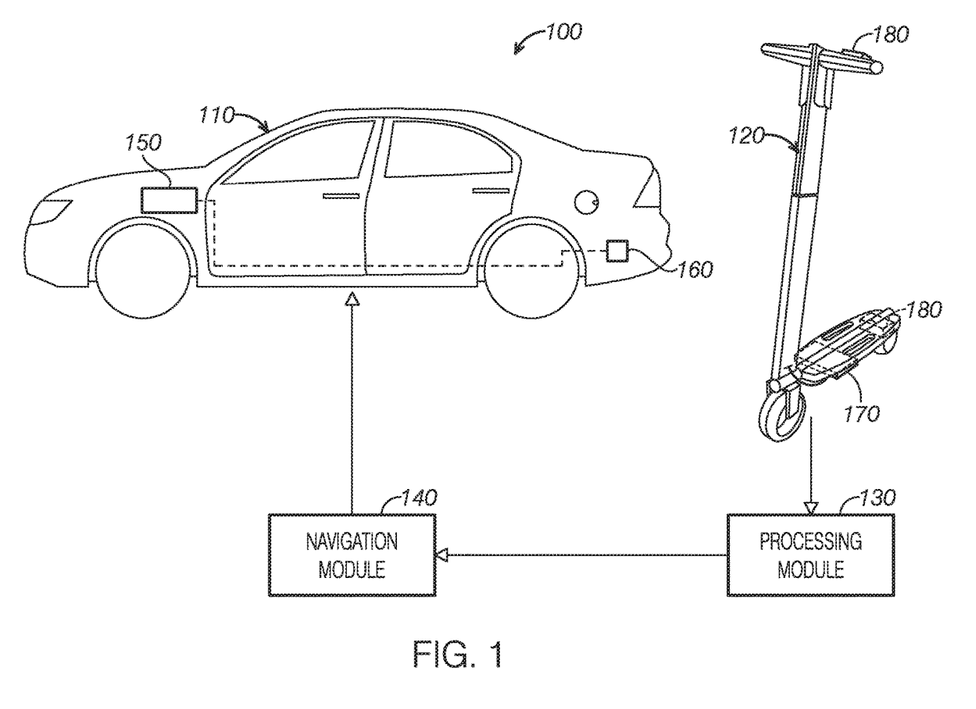
FIG. 1 is a schematic diagram of a vehicle system according to one or more embodiments of the present disclosure.

Referring to FIG. 1, a vehicle system 100 according to one embodiment of the present disclosure is illustrated. The vehicle system 100 includes a vehicle 110 and an auxiliary vehicle 120, a processing module 130 configured to determine a remaining traveling range of the auxiliary vehicle 120; and a navigation module 140 configured to suggest at least one stop for the vehicle based on the remaining travelling range and a selected destination. For the illustration purpose, a stop is described as a commercial parking lot with charge. It should be understood that a stop may be a free parking lot, a parking lot with limited time, or a street parking.

It should be understood that communications among the modules, devices and components may be achieved in many forms. For example, the communications may be achieved via communication modules or communication systems. The communication modules may be programmed to enable a wire or wireless communication between the devices of the vehicle system and communication to other devices, such as a remote server. In some embodiments, the communication modules may include communication protocol between the vehicle and other vehicles. The communication module may further be configured to receive information from a cellular tower and software defined networking (SDN) related to the vehicle and transmit information to the cellular tower and the SDN. The SDN correspondingly establishes communications with a smart phone, a desk computer, a laptop computer, a smart key or other electronic devices or configured to establish communication via a sub-cellular tower or the same cellular tower. The cellular communication via the SDN may be initiated by a personal computer, a laptop computer, a telephone connected with the network via WiFi. The communication modules may be also programmed to use any numbers of communication protocols such as using infrared, Blue Tooth, WiFi, or low energy consumption Blue Tooth to communicate directly with a remote device of a user of the vehicle or other devices. The communication protocol may include a protocol such as Dedicated Short Range Communications (DSRC).

In some embodiments, the vehicle 110 may be a motor vehicle such as a sedan, a van, a SUV or truck. In some embodiments, the auxiliary vehicle 120 may be a short distance personal mobility device, such as an electric bicycle, an electric scooter, a two-wheeled self-balancing personal transporter, or an electric unicycle. The auxiliary vehicle 120 has a small volume, light weight, and is easy for a user to carry and be stored in a place such as an office. The auxiliary vehicle 120 may be stowed in multiple locations in the vehicle 110, such as a trunk or a passenger compartment, a rack on the roof or a rack on the back. Further, the vehicle 110 may include an on-board battery 150 and a charging interface 160. The charging interface 160 is configured to allow the on-board battery 150 to electrically connected a power source such as an engine of the vehicle 100 and a battery 170 of the auxiliary vehicle. The vehicle 110 may further be configured to communicate with the auxiliary vehicle 120 to receive and transmit information. For illustration purpose, the auxiliary vehicle 120 is shown as a foldable electric scooter. The electric scooter has a small size, light weight, and is easy to be stored in a vehicle, and carried by the user and placed in an office.

The auxiliary vehicle 120 may include a power source for a motor 180. The power source may be a battery, a solar cell or other power sources suitable to power a personal transportation device. In the depicted embodiment, the power source of the auxiliary vehicle 120 is a battery 170 configured to power the motor 180. The motor 180 drives the wheels to move the auxiliary vehicle 120. The battery 170 of the auxiliary vehicle 120 may be configured to connect with a power source or a power system of the vehicle 110 to be charged via the charging interface 160. The vehicle 110 may charge the battery 170 of the auxiliary vehicle 120 via the charging interface 160 during the traveling or parking. The charging interface 160 may be a wired charging interface or a wireless charging interface to provide multiple charging modes.

The vehicle 110 in the vehicle system 100 travels to a stop from a current location or a starting location where the auxiliary vehicle 120 is used to complete the remaining trip to a selected destination. The vehicle system 100 (e.g., a navigation system for the vehicle 110 and the auxiliary system 120) may suggests at least one stop to the user based on a remaining travelling range of the auxiliary vehicle 120 and a selected destination. The vehicle system 100 may suggest a stop with an affordable parking fee, and a distance between the stop and the destination is selected such that the auxiliary vehicle 120 can travel to the destination without the need to charge the battery.

In one embodiment, the distance between the stop and the destination is determined not to exceed the remaining traveling range of the auxiliary vehicle 120. It should be understood that the distance between the selected destination and the stop is a traveling distance of the auxiliary vehicle 120 and is not a straight-line distance. In this way, the auxiliary vehicle 120 can arrive in the destination without seeking a place such as a charging station to charge the battery. Subsequently, the user may charge the battery 170 at the destination if needed. In this way, the user can return to the stop using the auxiliary vehicle 120 and switch to the vehicle 110.

Alternatively, the distance between the stop and the destination may be determined not to exceed a half of the remaining traveling range of the auxiliary vehicle 120. In some circumstances, the auxiliary vehicle 120 may not be sufficiently charged or the time is limited for charging the battery 170 at the destination. As such, the stop may be recommended to have a route which is half of the remaining traveling range of the battery 170. In this way, the auxiliary vehicle 120 can return to the stop even if the battery 170 cannot be charged at the destination.

In one or more embodiments, the auxiliary vehicle 120 is a personal mobility device powered by electricity. The processing module 130 is configured to monitor a state of charge of the battery of the auxiliary vehicle 120 and determine the remaining traveling range of the auxiliary vehicle 120 based on the state of charge. For example, the processing module 130 may monitor the state of charge of the auxiliary vehicle 120 in real time and calculate the remaining traveling range when recommending a stop according to the state of charge and then use the information to recommend the stop and the route. In other words, the remaining traveling range of the auxiliary vehicle 120 corresponds to an initial state of the charge of the battery of the auxiliary vehicle 120 when recommending a stop. In one embodiment, the processing module 130 may be programed to monitor the battery plugged in the charging interface 160 to determine state of charge of the battery 170 of the auxiliary vehicle 120. The processing module 130 is further configured to estimate a traveling range of the battery 170, which is a function of the state of charge. Additionally or alternatively, the auxiliary vehicle 120 includes an auxiliary vehicle management system to manage the information of the auxiliary vehicle 120, such as state of charge, the remaining traveling range, user specific information. In this way, the processing module1 30 may communicate with auxiliary vehicle management system via in-vehicle wired network or wireless network (including but not limited to infrared, Bluetooth, cellular, Wi-Fi) to obtain a traveling range from the auxiliary vehicle 120 directly, In another embodiment, the state of charge of the auxiliary vehicle 130 at the stop is estimated based on the time for the vehicle 110 to arrive in the stop, and the remaining traveling distance is calculated based on the state of charge.

In some embodiments, the vehicle 110 can charge the auxiliary vehicle 120 during traveling. As such, the state of charge of the auxiliary vehicle 120 is increased due to additional charging of the battery 170, which will result in the remaining traveling range of the auxiliary vehicle 20 greater than that corresponding to the initial state of charge when the stop is recommended. In other words, the distance between the stop and the selected destination or the remaining traveling distance of the auxiliary vehicle 120 is greater than the remaining traveling distance calculated based on the initial state of charge. In this circumstance, the remaining traveling range of the auxiliary vehicle 120 may be determined as a sum of the traveling range estimated based on the initial state of charge at a starting location and the traveling distance based on the increased charge added during the traveling of the vehicle 110 from the starting location to the stop. It should be understood that the remaining traveling distance can be estimated by various approaches. For example, the vehicle system may estimate a traveling time corresponding to different routes and calculate the increased state of charge during the traveling and corresponding increased traveling range to estimate the final remaining traveling g range of the auxiliary vehicle 120. In one example, the increased traveling range can be obtained from the product of the traveling time of the vehicle 110 multiplying a state of charge in a unit time and the correlation of state of charge in unit time with the traveling range.

In some embodiments, the navigation module 140 may be further configured to suggest the stop based on environment conditions. In one example, the environment condition is a parking lot condition. In one embodiment, the navigation module 140 may be further configured to present the parking fees in each suggested stop to the user. The vehicle system may be further configured to communicate with a stop selected by the user to reserve the parking spot based on the user's selection For example, the navigation module 140 may collect real time information on the locations, vacancy, parking fee of each stop via a network. In another example, the navigation module 140 may obtain information on the location and parking fee from the in-vehicle database or travelling journals related to the stops. Then, the system may present the available stops with a distance to the selected destination within the remaining traveling range of the auxiliary vehicle 120. Additionally, the system may present the stops in an order to increased parking fee. That is, the stop with the lowest parking fee is shown first.

In one embodiment, the navigation module 140 may be configured to generate a route from a current location to the selected stop for the vehicle 100 based on the user's selection and a route from the selected stop to the selected destination for the auxiliary vehicle 120. The route for the vehicle 110 includes roads or other infrastructures allowing vehicle to travel. The route for the auxiliary vehicle 120 includes the roads and infrastructures suitable for the auxiliary vehicle 120 to travel. For example, if the auxiliary vehicle is an electric bicycle, the route includes infrastructures suitable for the bicycle such as bike paths, bicycle lanes and sidewalks (where permitted).

In one embodiment, the route of the auxiliary vehicle 120 is further determined based on the remaining travelling range of the auxiliary vehicle 120. As described above, the route of the auxiliary vehicle 120 should be within the remaining traveling range of the auxiliary vehicle 120 to ensure that the auxiliary vehicle 120 can reach the selected destination.

In addition, as described hereinafter and elsewhere in the application, the processing module 130 may determine whether to charge the auxiliary vehicle 120 by an on-board battery 150 or an engine of the vehicle 100 via a charging interface when traveling to the stop. The processing module 130 may further determine if the auxiliary vehicle 120 has sufficiently charge to return to the stop from the destination. In one embodiment, when the auxiliary vehicle 120 is about to depart to a destination from the stop, the processing module 130 may determine if the present state of charge is at least two times of state of charge needed to travel to the destination. If the state of charge is less than two times of required charge, the vehicle system may alert the user and suggests the user to charge the auxiliary vehicle 120 at the destination. In another embodiment, the processing module 130 monitors the state of charge of the auxiliary vehicle 120 in real time. If it is determined that the state of charge of the auxiliary vehicle 120 is not sufficient to return to the stop, the system alerts and suggests the user to charge the auxiliary vehicle 120 at the destination.

In one embodiment, the environment condition is a weather condition and the navigation module 140 may recommends a stop based the weather condition. Thus, at an unfavorable weather condition, such as a day of raining, fogging, snowing, poor air quality (air quality index (AQI) below predetermined value), the navigation module 140 may recommend a stop closer to the destination than that recommended at a normal weather condition.

In one embodiment, the navigation module 140 may be integrated as a part of an in-vehicle navigation system or a part a smart phone to communicate with the auxiliary vehicle 120. For example, the navigation module 140 may be built in or loaded as a smart phone navigation APP software. Similarly, the processing module 130 may also be integrated in an in-vehicle navigation system (e.g., a telematics system) or a smart phone. It should be understood that the processing module 130 and navigation module 140 may be integrated in an in-vehicle navigation system and a smart phone, respectively as long as the processing module 130 and navigation module 140 can establish communication. Alternatively, the processing module1 30 and navigation module 140 may be located in a cloud, and communicate with the vehicle 110 and auxiliary vehicle 120 via a wireless network.

Continuing with FIG. 1, according one or more embodiments, a vehicle system 100 includes a vehicle 110 and an auxiliary vehicle 120 that can be stowed in the vehicle 100, a processing module 130 configured to determine a remaining traveling range of the auxiliary vehicle 120; and a navigation module1 40 configured to suggest at least one stop for the vehicle 100 based on the remaining traveling range and a selected destination.

Figure 2:
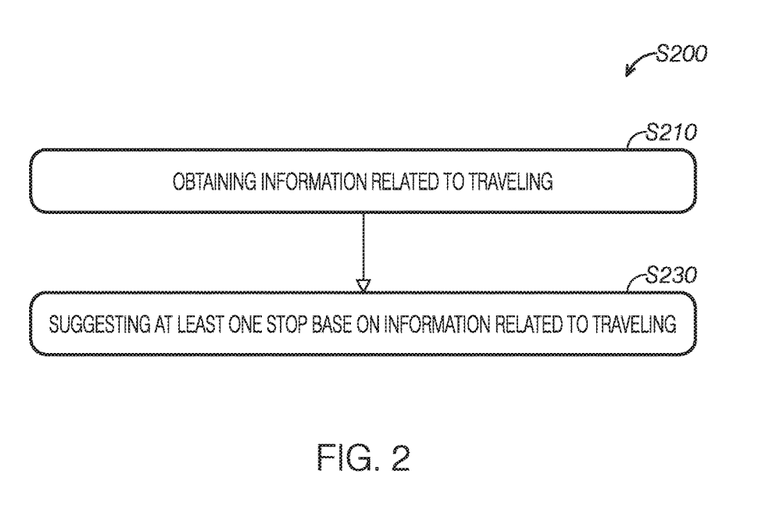
FIG. 2 is a flowchart of a traveling method for a vehicle and an auxiliary vehicle according one or more embodiments of the present disclosure.

Referring to FIG. 2, a traveling method S200 is illustrated for the vehicle 110 and the auxiliary vehicle 120 according to one or more embodiments of the present disclosure. For the illustration purpose, the processing module 130 and navigation module 140 are described to be integrated in a mobile device such as a smart phone. It should be understood that the processing module 130 and/or navigation module 140 may be disposed in other devices. For example, the navigation module 140 may be located in a traveling management server at a network Cloud and communicate with user's mobile device. The processing module 130 may be located at an in-vehicle system (e.g., telematics system) and communicate with user's mobile device. At step S210, the method 200 may obtain information related to the traveling, including but not limited to user information such as a starting location, a destination, and information on the auxiliary vehicle such as a remaining traveling range.

Figure 3:
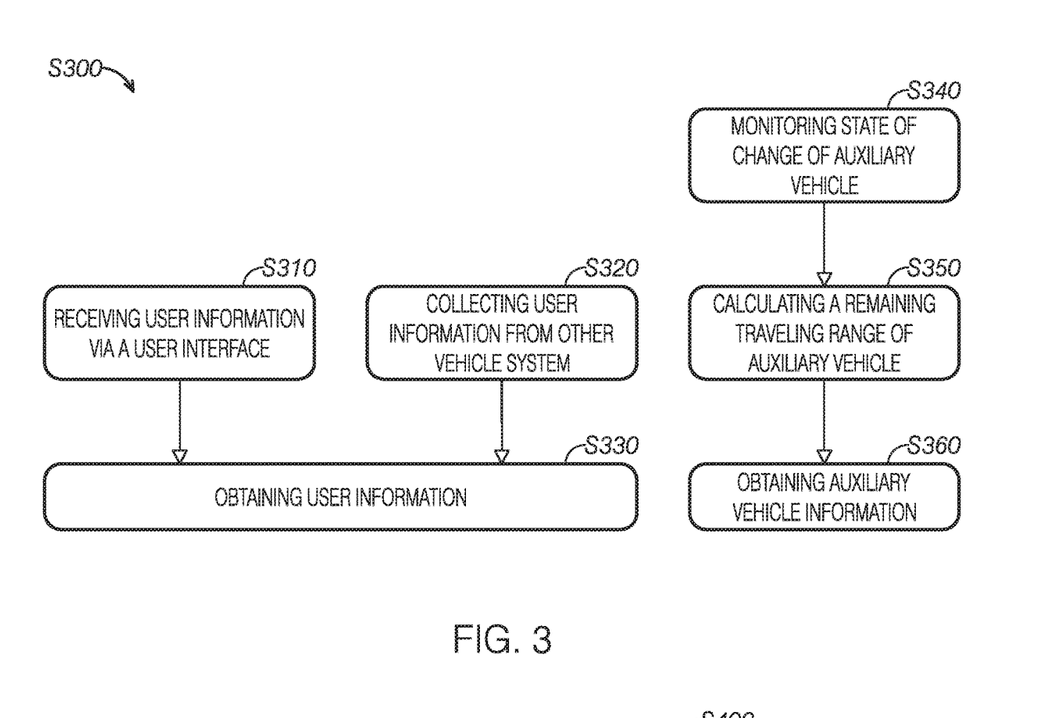
FIG. 3 is a flowchart of a method to obtain information on a user and a vehicle/auxiliary vehicle according an embodiment of the present disclosure.

Referencing FIG. 3, a method S300 to obtain or collect information related to the user, the vehicle and/or auxiliary vehicle is shown. For example, at step S310, the method S300 may receive user information such as a starting time, a starting location, and a destination by a user input via the interface of the mobile device. Alternatively, at S320, the user information may be collected via other vehicle systems without the user input. For example, an in-vehicle positioning system may obtain the current location from a navigation system and default it as the starting location. At step S330, the method S300 includes obtaining the user information for later processing. In addition, at step S340, the method S300 may include monitoring the state of charge of the auxiliary vehicle 120 and calculate the remaining traveling range at the step S350 via the processing module 130.

As described hereinafter and elsewhere of the application, the processing module1 30 may determine the remaining travelling range of the auxiliary vehicle 120 by any appropriate approaches. Further, the processing module 130 may obtain other information of the auxiliary vehicle 130 including, but not limits, state of charge and the maintenance status of the auxiliary vehicle 120. As such, the method S300 obtains information related to the user and the auxiliary vehicle.

Now turning to FIG. 2, the method S200 goes to step S230 to recommend or suggest at least one stop based on information related to the user and the auxiliary vehicle.

Figure 4:
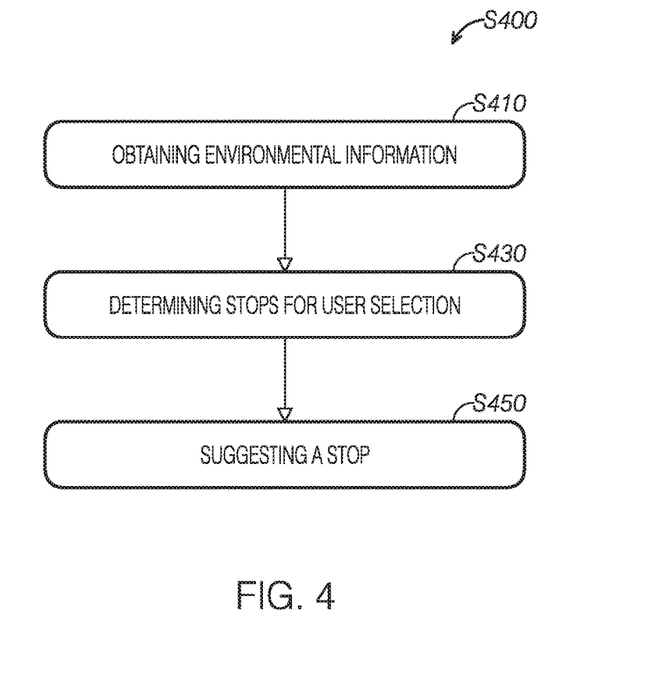
FIG. 4 is a flowchart of a method to suggest a stop based on environment condition according to one embodiment of the present disclosure.
Figure 5:
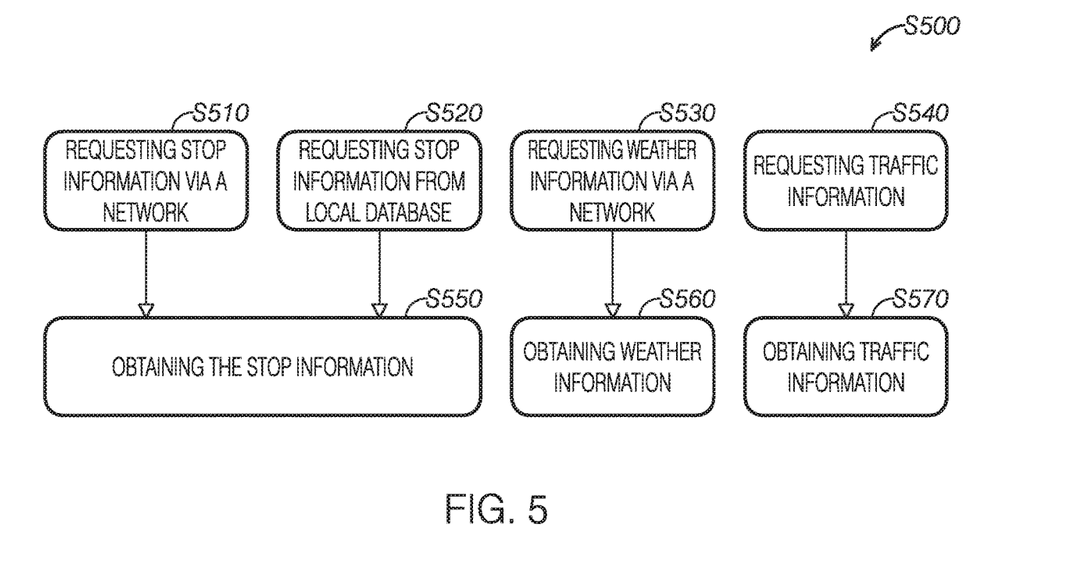
FIG. 5 is a flowchart of a method to obtain environment information according to one embodiment of the present disclosure.

Referencing FIG. 4, a method S400 to recommend a stop is shown. First, the method S400 may obtain environment information at step S410, such as the information on a stop, a weather condition, a road condition. Referencing FIG. 5 a method S500 to obtain environment information is shown. For example, the method S500 may send a request to an information provider and receives a feedback from the information providers via network. Specifically, the method S500 requests the information on the stop via a network at step S510, and obtains the information on the stop at step S550, such as, a parking spot location, parking spot availability, and parking fee. Additionally, or alternatively, at step S530, the method S500 may inquiry or request weather information, and obtain weather information at step S560. Additionally or alternatively, the method S500 may send inquiry or request traffic information at S540 and obtain the traffic information (e.g., road condition) at S570. Alternatively, the method S500 may obtains relevant information via vehicle database. For example, the method S500 may inquiry the stop information from a local database at step S520, and obtain the stop information at step S550.

Returning to FIG. 4, the method S400 then goes to step S430 to determine the stops for user to select. The method S400 may include determining at least one available stop based on the stop information obtained at step S550 and the remaining traveling range of the auxiliary vehicle obtained at S360 for a user selection. As described in hereinafter and elsewhere of the present application, a stop may be determined based on a criterion that a distance between the stop and the destination does not exceed the remaining traveling range of the auxiliary vehicle 120. Alternatively, a stop may be determined based on a criterion that a distance between the stop and the selected destination does not exceed a half of the remaining traveling range of the auxiliary vehicle 120. One or more available stops can be determined for the user to select.

At step S450, the method S400 may suggest at least one stop determined at step S430. For example, the method S400 may present the suggested stops to the user via a user interface of the mobile device. Additionally or alternatively, the routes relevant to the stops and the estimated arriving time may be provided to the user at the same time or in response to the user instructions. For multiple available stops, a list for the stops may be provided for the user at an order selected by the user. For example, the order may be arranged based on the parking fee, the driving distance of the vehicle, the driving distance of the auxiliary vehicle, the total distance, and the estimated time to arrive in the destination. Thus, it is easy for the users to select a stop according his/her preference.

Figure 6:
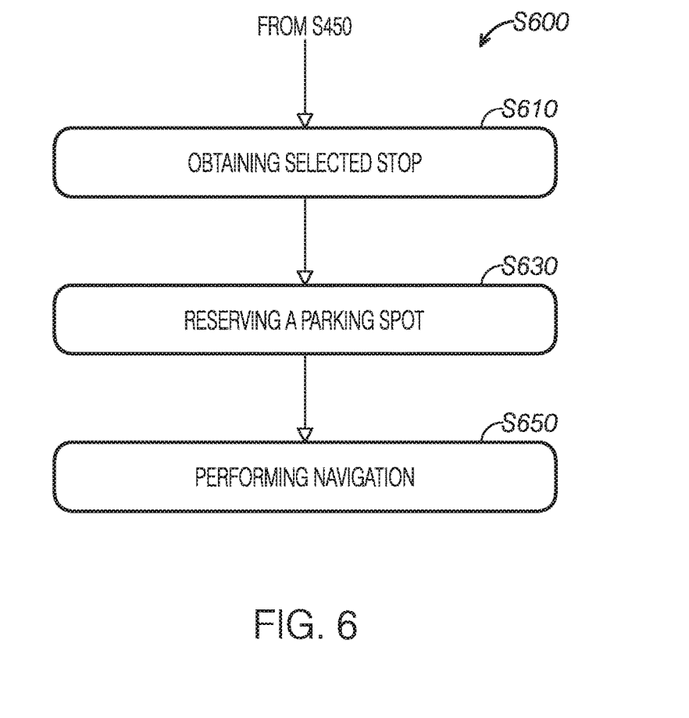
FIG. 6 is a flowchart of a method to reserve a parking spot for a user according one embodiment of the present disclosure.

Alternatively, upon selection of a stop by the user, a parking spot can be reserved for the user. Referring to FIG. 6, a method S600 to reserve a parking spot is shown. As described above, at step S450, at least one available stop is provided to the user, then, the method S600 obtains selected stops at step S610. For example, after the user selects a parking spot, the parking spot is input or selected via a user interface of a mobile device. Alternatively, the method S600 may communicate with the remote service center after the user selection, and notify the service personnel in the remote service center of the selected stop. Thereafter, method S600 goes to step S630 to reserve the parking spot according the user selection. In one embodiment, the method S600 may communicate with the stop selected by the user to reserve the parking spot at step S630 and pay the fee. For example, Patent CN 103646568 A discloses a method of reserving a parking spot, paying a fee, and instructions. At step S650, the method 600 may perform navigation. In one or more embodiments, after the user's selection, a route from the starting location to the selected stop and a route from the selected stop to the destination may be generated.

Figure 7:
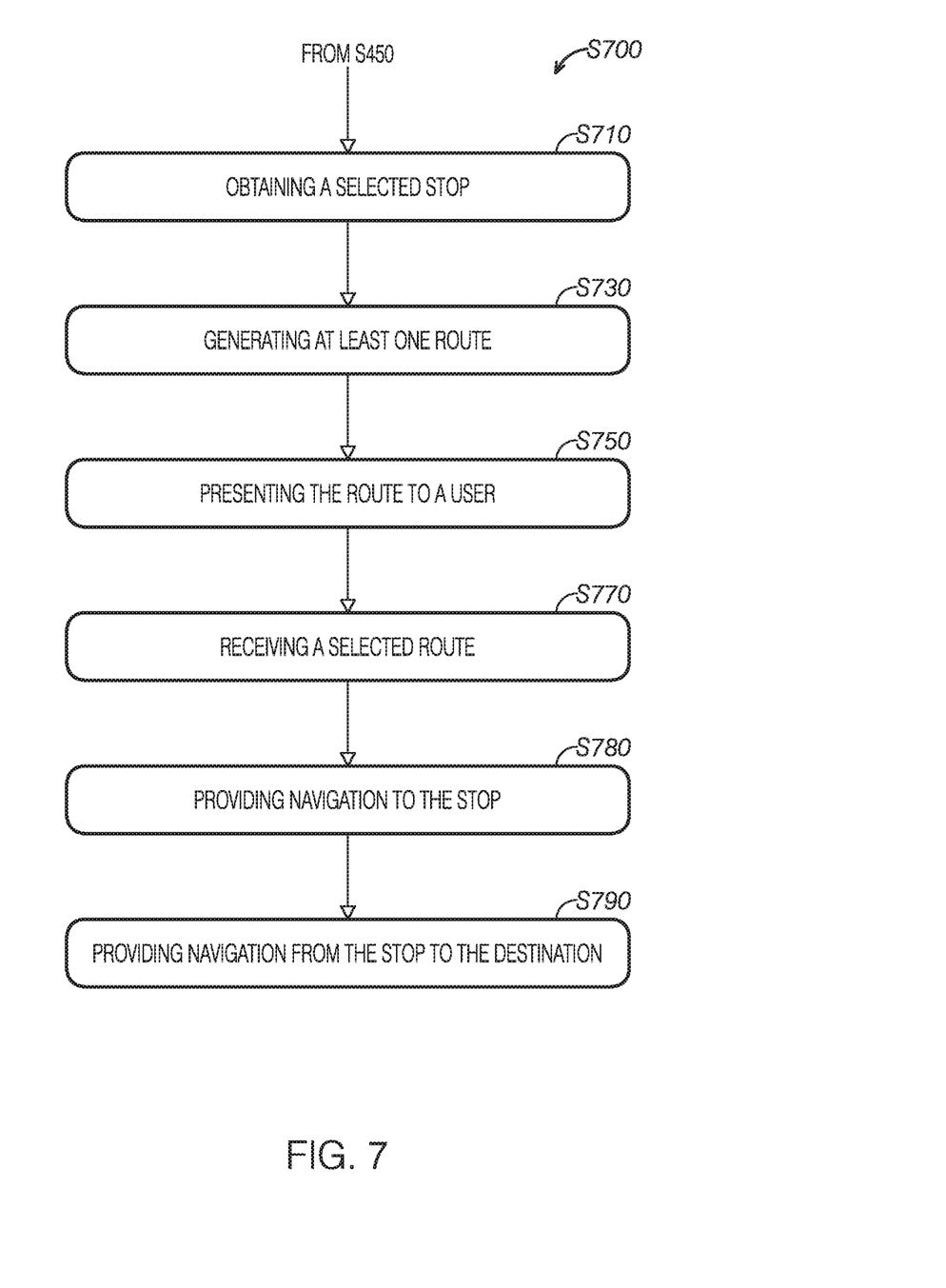
FIG. 7 is a flowchart of a method of navigation according an embodiment of the present disclosure.

Referring to FIG. 7, a method S700 to guide the user to the stop and the destination is shown. As described above, at least one of available stops is provided to the user for his/her selection at step S450. Thereafter, the method S700 obtains the stop selected by the user at step S710. Then, at step S730, the method S700 generate at least one route based on a starting location, the selected stop, and the selected destination. The estimated traveling time may be estimated and provided at this step.

Next, the method S700 may present the generated route to the user via a user interface for his/her selection at step S750. The method S700 may receiving a user selection on a route via the user interface at S770. Next, the method S700 provides navigation for the vehicle 110 form the starting location to the stop at step S780. For example, the method S700 may provide navigation for the user via a mobile device or via an in-vehicle navigation system (a navigation unit in the vehicle 110, for example). Next, when the user arrives in the parking lot or the stop, the method S700 further provides navigation for the user to ride the auxiliary vehicle 120 from the stop to destination at step S790.

Figure 8:
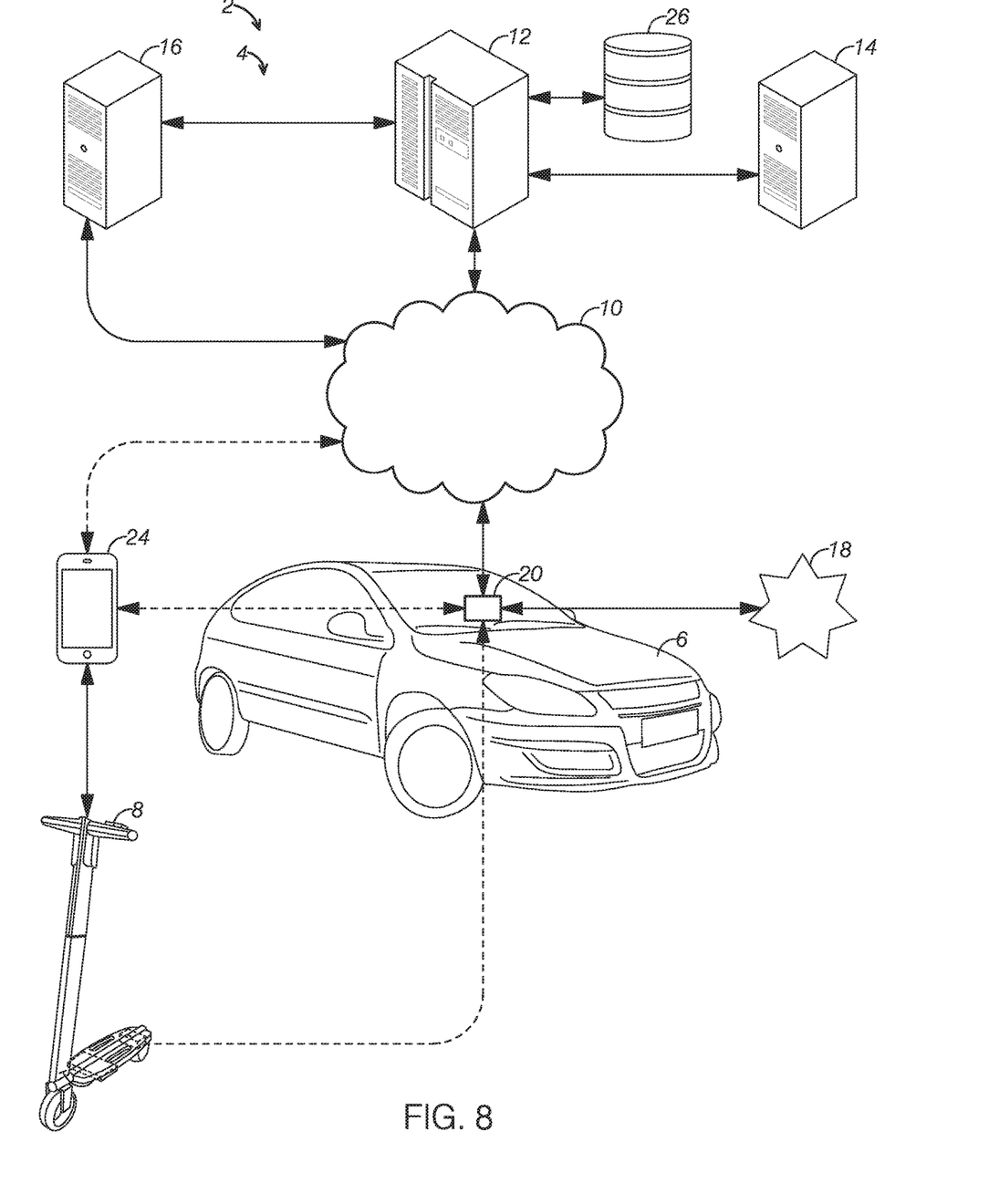
FIG. 8 depicts a representative telematics and/or navigation system in which illustrative embodiments may be implemented.

Referring to FIG. 8, a telematics system 2 according to one embodiment of the present disclosure is illustrated. The telematics 2 may be a telecommunications and/or data-processing system applicable to mobile vehicles such as a vehicle and an auxiliary vehicle described above. The telematics system 2 may provide features to support navigation, control, communications and/or entertainment, for example, its navigation aspects may provide features to guide for a user who drives a vehicle and an auxiliary vehicle during a trip. The telematics system 2 accordingly may comprise a navigation system 4 and may further comprise other system not discussed here.

The navigation system 4 may comprise a vehicle 6, an auxiliary vehicle 8, a network or cloud 10, a server 12 and a positioning system 18 connected to the network 10. The vehicle 6 may be any device for transporting persons or things such as a car. The auxiliary vehicle 8 may be a short distance personal mobility device, such as an electric bike, an electric scooter, a two-wheeled self-balancing personal transporter, an electric unicycle. The auxiliary vehicle 8 may be stowed into the vehicle 6. In some embodiments, a battery in the auxiliary vehicle 8 may be charged by an engine or a battery/motor in the vehicle 6.

The vehicle 6 may include a telematics unit 20 that may be or may include a navigation unit 22 as described in detail below in association with FIG. 9.

The navigation system 4 may further comprise a mobile computing device 24, which may be a personal digital assistant (PDA), a smart phone, a tablet device and the like. The mobile computing device 24 may be connected to network 10 by a wireless and/or hardwired connection. The mobile computer device 24 accordingly may communicate via network 10 independently from the vehicle 6 with the server 12, the navigation unit 22 or other parts of the navigation system 4. Further, the mobile computing device 24 may include an application incorporating the navigation aspects of the navigation unit 22. A user consequently may employ the mobile computing device 24 to input data and receiving trip-related information from the navigation unit 22 or the trip server 12.

The server 12 may be a trip management server which provides trip related information to the vehicle 6 in the navigation system 4. The server 12 may be further connected with one of a traffic content provider 14, a weather content provider 16, a parking lot database 26, respectively. The navigation unit 22 may receive the information on the environment conditions such as the traffic, weather condition and parking lot and use the information to determine a route for a user among other factors for selection of the route.

The network 10 provides a communication backbone for the telematic system 2 and/or the navigation system 4. When the vehicle 6 are the auxiliary vehicle 8 are moving, the network 10 may employ one or more wireless communications technologies such as Wi-Fi, cellular-telephone services such as 3G, or 4G networks, direct satellite links, and/or terrestrial radio-frequency links. Any of these technologies, alone or in combination, may provide for unidirectional or bidirectional data transfer between the vehicle 6, the auxiliary vehicle 8, the servers 12, and the mobile computing device 24.

The positioning system 18 may be any device or system capable of determining the location of vehicle 6 and the auxiliary vehicle 8, such as navigational systems that transmit signals from satellite or terrestrial sources to receivers, or devices that track location by dead reckoning. An example of a satellite-based positioning system is the Global Positioning System (GPS), which employs multiple satellites that broadcast signals containing time and position data. A GPS receiver can use the signals to determine a location. The term "GPS" as used herein is meant to include any satellite-based positioning system. Because the GPS and analogous systems rely on signals broadcast from space, FIG. 8 shows positioning system 18 as independent from network 10. In some embodiments, network 10 may be or may share equipment with positioning system 18. A cellular communications network 10, for example, may overlap with a cellular positioning system 18. The positioning system 18 may also be incorporated in the computing device 24.

The navigation unit 22 may further communicate with an energy level gauge of the auxiliary vehicle 8 to obtain information on a current energy level to estimate a remaining driving range of the auxiliary vehicle 8. For example, the navigation unit 22 may be communicated with a charging interface of the auxiliary vehicle 8. The navigation unit 22 or the mobile computing device 24 accordingly may display information on the energy level of the auxiliary vehicle 8 and the remaining driving range on a user interface.

Figure 9:
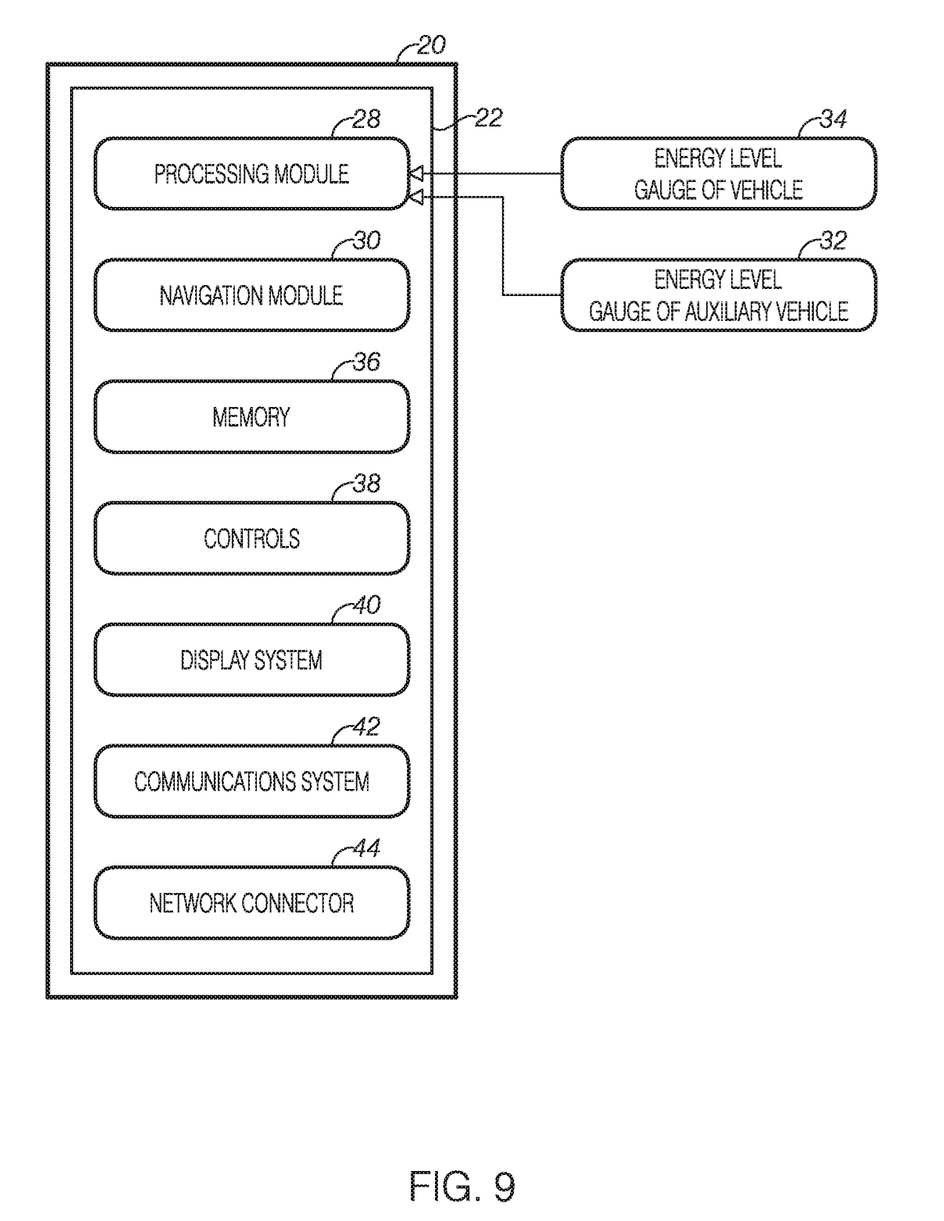
FIG. 9 shows a block diagram of a navigation unit in which illustrative embodiments may be implemented.

Referring to FIG. 9, a telematics unit 20 may be a telecommunications and/or data-processing device permanently or removably installed in a vehicle 6 to provide features such as navigation, entertainment, vehicle tracking, and/or vehicle control. This application discusses the navigational aspects of telematics unit 20 even though other aspects may be present. The telematics unit 20 may be or may comprise navigation unit 22.

The navigation unit 22 is the portion of telematics unit 20 devoted to navigation. The navigation unit 22 may comprise a processing module 28, a navigation module 30, memories 36, controls 38, display subsystems 40, communications systems 42 and network connector 44. The navigation unit 22 may include other alternative, or additional elements and may omit one or more of the elements listed above.

The processing module 28 provides computational resources to determine a remaining driving range of the auxiliary vehicle 8. The navigation module 30 provides computational resources to select a stop and provide routes for the user. It should be understood that the processing module 28 and the navigation module 30 may be integrated in one processor.

The processing module 28 may communicate with an energy level gauge 32 in the auxiliary vehicle 8 to obtain information on the current energy level. In one example, the auxiliary vehicle may be a personal transportation device powered by a battery such as an electric bicycle or an electric scooter. The energy level gauge may a meter measuring a state of charge of a battery in the auxiliary vehicle 8. Alternatively, the processing module may communicate with a charging interface of the auxiliary vehicle and receive information on the state of the charge. The processing module 28 may further communicate with an energy level gauge 34 of an energy source in the vehicle 6 (e.g., a fuel gauge and/or state of charge). In one application, the battery in the auxiliary vehicle 8 may be charged by the energy source such as a motor or battery in the vehicle 6 when the vehicle is driven to a stop. The amount of the energy depleted from the energy source in the vehicle 6 may be used to estimate the added energy to the auxiliary vehicle 8 during the trip before the stop such that the remaining driving range of the auxiliary vehicle can be estimated accurately.

The navigation unit 22 accordingly may employ one or more processing module 28 and the navigation module 30 to run programs to support the communications, computation, positioning, and/or display and/or other features.

The memory 36 may include a memory and/or persistent storage to provide program and data storage. Navigation unit 22 may employ different types of memory for different purposes.

The controls 38 may include any feature that allows the user to regulate the operation of navigation unit 22. For example, the control 38 may be a physical switch to turn the navigation unit 22 on or off; a keyboard to input alphanumeric data; a touch-screen interface of display system 40; a voice-recognition system programmed to recognize spoken commands; a remote control; and/or other mechanisms, alone or in combination. The navigation unit 22 may provide a user-interface with controls to allow the user to define, for example, a starting location of vehicle 6, a destination of a trip, select a stop before the destination, select a parking lot, pay a parking fee online; or to issue any other commands appropriate to the navigation unit 22.

The display 40 provides a visible output capable of displaying content. The display 40 includes not only a display component such as an LCD or LED panel but also supporting hardware and software. Navigation unit 22 may, for example, rely on GPS position data to identify the current location of vehicle 8 and show a route from the current location to a stop. The display 40 may further show information including but not limited to the current energy level such as state of charge and the remaining driving range of one of the auxiliary vehicle 8 and the vehicle 6. The display 40 may further implement controls 38 of unit 22, for example, through touch-screen technology.

Communications system 42 may be one or more receivers and/or transmitters that allow navigation unit 22 to connect to network 10. For the moving vehicle 6 and the auxiliary vehicle 8, communications system 38 may employ a wireless communications link such as Wi-Fi, cellular communications, and/or satellite communications. This connection may be used to communicate with the trip management server 12, for example, to request and receive trip related information and environment information.

Navigation unit 22 may further comprise a network connector 44 such as an Ethernet connector. The network connector 44 may allow the navigation unit 22 to send and/or receive data via a hardwired network without relying on a wireless connection, for example, in a location that does not offer wireless communications. The network connector 44 may also enable in-vehicle networking with other compatible devices.

In one embodiment, the navigation system 22 may further comprise the mobile computing device 24. For example, the mobile computing device 24 may be a smart phone. Via the wireless network, the network connector 44, or other means, the smart phone 24 may connect to the navigation unit 22 and offer services and/or resources to the navigation unit 22. For example, a keyboard or touch screen of the smart phone 24 may replace the controls 34 of the navigation unit 22; or a display of the smart phone 24 may replace display 36 of the navigation unit 22. For another example, the mobile computing device 24 may be a smartphone with an integral GPS receiver that may augment or replace positioning system 18. The navigation unit 22 accordingly may cooperate with or incorporate a mobile computing device 24.

Figure 10:
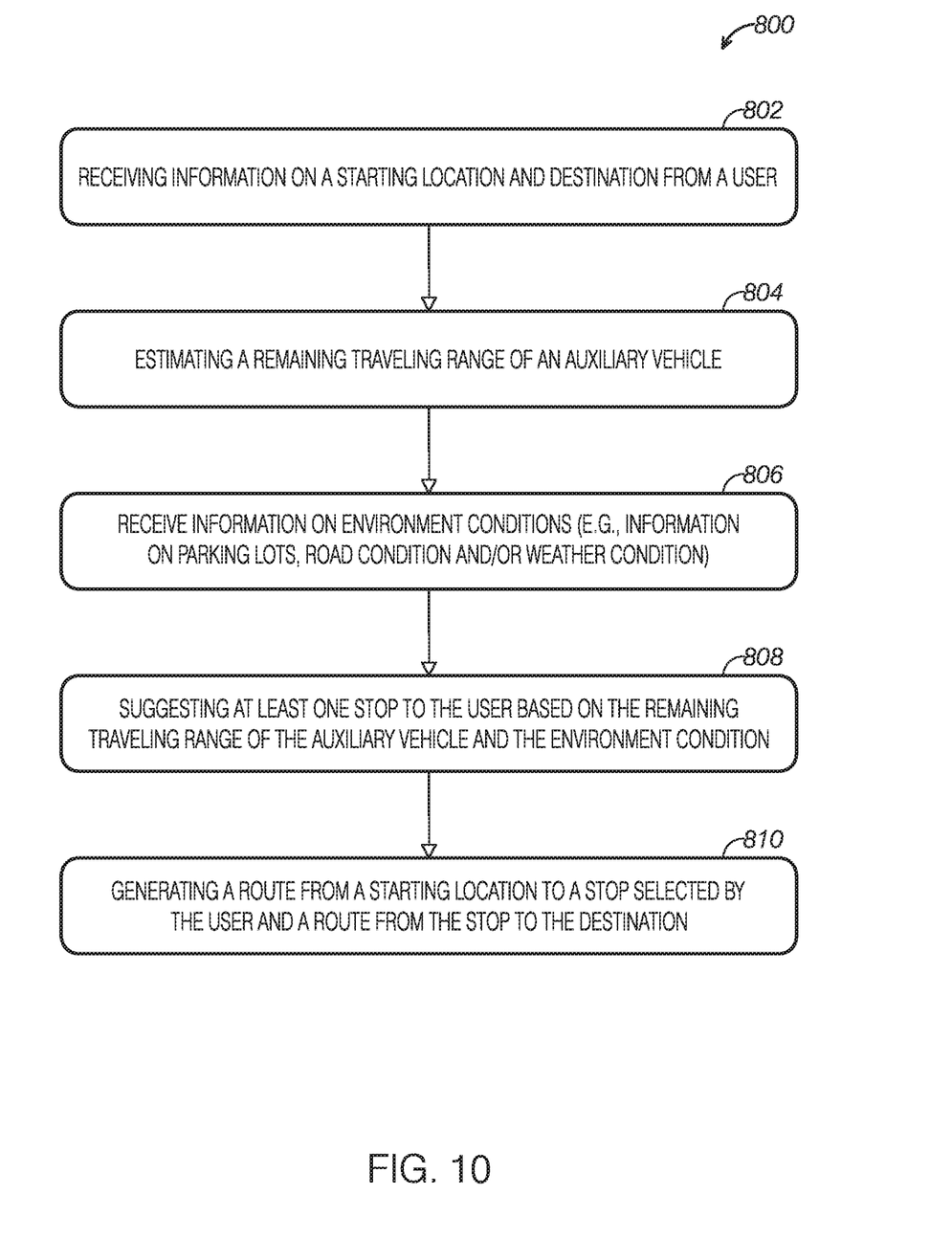
FIG. 10 shows an example navigation method for a vehicle and an auxiliary vehicle in a trip according to one embodiment of the present disclosure.

Referring to FIG. 10, a method 800 implemented in the navigation system 4 is shown. At 802, the method 800 may comprising receiving information on a starting location and a destination from a user via the navigation unit 22 or the mobile computing device 24. At 804, the method 800 may include estimating a remaining travelling range of an auxiliary vehicle 8 based on an energy level of a power source of the auxiliary vehicle. In one example, the auxiliary vehicle 8 is a personal transportation vehicle power by a battery. The auxiliary vehicle 8 is not charged during traveling to a stop. The energy level of the auxiliary vehicle 8 may be a state of charge when the auxiliary vehicle 8 is loaded into the vehicle 6. In another example, the auxiliary vehicle 8 is charged by a power source of the vehicle 6 during a traveling to the stop. The energy level of the auxiliary vehicle 8 may be the state of charge when it is loaded to the vehicle 6 plus the increased state of charge when the vehicle 6 arrives in the stop.

Additionally or alternatively, the method 800 may receive information on the environment conditions such as the information on the parking lot, road condition and/or weather condition at 806. Next, the method may suggest at least one stop to a user based on the remaining traveling range of the auxiliary vehicle 8, and the environment condition (e.g., availability of the parking spot, parking fee, road condition and weather condition) at 808. For example, the method 800 may recommend a stop where a distance from stop to the destination is less than the remaining traveling range of the auxiliary vehicle 8. In another example, the method 800 may suggest a stop where a distance from stop to the destination is less than a half of the remaining traveling range of the auxiliary vehicle 8. The road condition and the weather condition may further be considered in selection of a stop. In one example, a stop may be recommended when there is less traffic on the route from the starting location to the stop and from the stop to the destination. In another example, the stop may be selected to be closer to the destination at an unfavorable weather condition comparing to a normal weather condition.

Next, at 810, the method 800 may generate a route from a starting location to a stop selected by the user for the vehicle and a route from the stop to the destination for the auxiliary vehicle.

The navigation systems and the methods of the present disclosure recommends a stop for a vehicle based on a remaining travel range of the auxiliary vehicle and generate routes for the vehicle and the auxiliary vehicle accordingly. Both the capacity of an energy source of the auxiliary vehicle and the environment conditions are considered. As such, the selection of the route is optimized to provides the user a comfortable experience in the journey The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A navigation system for a vehicle and an auxiliary vehicle, comprising:
 a navigation unit including:
  one or more processors,
  a memory, and
  a plurality of instructions stored in the memory executable by the one or more processors to:
   communicate with an energy level gauge of the auxiliary vehicle, obtain information on an energy level of a power source in the auxiliary vehicle and determine a remaining traveling range of the auxiliary vehicle based on the energy level, communicate with a weather content provider and obtain information on a weather condition from the weather content provider, and suggest at least one stop for the vehicle between a starting location and a destination based on the remaining traveling range of the auxiliary vehicle and the weather condition, and a user interface to present the at least one suggested stop with the weather condition to a user.

2. The navigation system of claim 1, wherein the at least one stop is suggested such that a distance between the suggested stop and the destination does not exceed the remaining traveling range of the auxiliary vehicle.

3. The navigation system of claim 1, wherein the at least one suggested stop is selected such that a distance between the suggested stop and the destination does not exceed a half of the remaining traveling range of the auxiliary vehicle.

4. The navigation system of claim 1, wherein the auxiliary vehicle is a personal mobility vehicle, and the power source is powered by a battery, and the energy level of the auxiliary vehicle is a state of charge of the battery and the state of charge of the battery is monitored in real time.

5. The navigation system of claim 4, wherein the auxiliary vehicle is charged by a power source of the vehicle while the vehicle is travelling to a selected stop, and the state of charge of the battery of the auxiliary vehicle is estimated based on a time needed to arrive at the selected stop.

6. The navigation system of claim 1, further comprising a smart phone, wherein the smart phone is configured to communicate with the navigation unit and a charging interface of the auxiliary vehicle to obtain the information on the energy level of the auxiliary vehicle.

7. The navigation system of claim 1, further comprising controls to enable the user to select a stop.

8. The navigation system of claim 1, wherein the navigation unit is configured to further communicate with a trip management server connected with a parking lot database to obtain information on locations, parking fees and availability of parking lots, and suggest the at least on stop further based on the information on the locations, the parking fees and the availability of the parking lots, and present to the user at least one suggested stop including information on the parking fees and the availability.

9. The navigation system of claim 1, wherein a distance from the suggested stop to the destination is shorter in an unfavorable weather condition comparing to a normal weather condition, and wherein the weather condition presented by the user interface includes temperature and air quality index.

10. The navigation system of claim 1, wherein wherein the navigation unit is further configured to communicate with a trip management server connected with a traffic content provider to obtain information on real time traffic condition, and present to the user the at least one suggested stop with information on a distance from the at least one suggested stop to the destination and estimated time to arrive in the destination.

11. The navigation system of claim 1, wherein the navigation unit is further configured to generate a route between the starting location and a selected stop for the vehicle and a route between the selected stop and a selected destination for the auxiliary vehicle.

12. The navigation system of claim 1, wherein the auxiliary vehicle is an electrical scooter, a two wheeled self-balancing personal transporter, an electric bicycle or an electrical unicycle.

13. A method implemented in a vehicle navigation system, the vehicle navigation system including a vehicle and an auxiliary vehicle capable of being stowed in the vehicle, the method comprising:

communicating, by one or more processors, with an energy level gauge in the auxiliary vehicle to obtain information on an energy level of a power source of the auxiliary vehicle;

estimating, by the one or more processors, a remaining travelling range of the auxiliary vehicle based on the energy level;

suggesting, by the one or more processor, at least one stop between a starting location and a destination based on the remaining traveling range of the auxiliary vehicle and an environment condition; and presenting the at least one stop to a user via a user interface;

wherein the environment condition is a weather condition, and wherein one or more processors is configured to communicate with a weather content provider and obtain weather information from the weather content provider.

14. The method of claim 13, wherein the environment condition further includes one of a parking condition and a traffic condition, and wherein the one or more processors is further configured to communicate with a trip management server to obtain information on the parking condition and the traffic condition.

15. The method of claim 13, further comprising receiving a user input on a selected stop via the user interface and generating a route between the starting location to the selected stop for the vehicle, and generating a route between the selected stop and the destination for the auxiliary vehicle.

16. The method of claim 13, further comprising presenting on a user interface a list of stops to a user, and wherein the list of stops includes information on the environment condition.

17. A computer-implemented method for guiding a user to drive a vehicle and an auxiliary vehicle in a trip, the method comprising:

communicating, by one or more processors, with an energy level gauge in the auxiliary vehicle to obtain an energy level of a power source of the auxiliary vehicle;

communicating, by the one or more processor, with a trip management service connected with a parking lot database to obtain information on parking lots;

estimating, by the one or more processor, a remaining travelling range of the auxiliary vehicle based on the energy level; and suggesting, by the more or more processors, at least one stop between a starting location and a destination based on the remaining traveling range of the auxiliary vehicle and the information on the parking lots; and presenting the at least one stop on a user interface to a user.

18. The method of claim 17, wherein the parking lot information includes on parking fees and availability of the parking lots.

19. The method of claim 18, further comprising presenting to the user a list of suggested stops and information on the parking lots.

* * * * *